United States Patent
Akasaka et al.

(10) Patent No.: US 10,523,334 B1
(45) Date of Patent: Dec. 31, 2019

(54) CONTROLLING GAIN MODULATION IN OPTICAL COMMUNICATION NETWORKS

(71) Applicant: Fujitsu Limited, Kawasaki-shi, Kanagawa (JP)

(72) Inventors: Youichi Akasaka, Plano, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/213,579

(22) Filed: Dec. 7, 2018

(51) Int. Cl.
| | |
|---|---|
| *H04J 14/02* | (2006.01) |
| *H04B 10/58* | (2013.01) |
| *H04B 10/548* | (2013.01) |
| *H04B 10/50* | (2013.01) |

(52) U.S. Cl.
CPC .......... *H04B 10/58* (2013.01); *H04B 10/503* (2013.01); *H04B 10/548* (2013.01)

(58) Field of Classification Search
CPC ............ H04B 10/2519; H04B 10/2537; H04B 10/548; H04J 14/0206
See application file for complete search history.

(56) References Cited

U.S. PATENT DOCUMENTS

| | | | |
|---|---|---|---|
| 6,433,921 B1* | 8/2002 | Wu | H01S 3/1022 359/334 |
| 9,246,624 B1 | 1/2016 | Yang et al. | |
| 9,997,887 B1* | 6/2018 | Akasaka | H04B 10/2519 |
| 2003/0234976 A1* | 12/2003 | Nishihara | H01S 3/06758 359/337.1 |
| 2004/0100684 A1* | 5/2004 | Jones | H01S 3/2383 359/337.11 |
| 2005/0063425 A1 | 3/2005 | Krastev et al. | |
| 2009/0196619 A1 | 8/2009 | Kim et al. | |
| 2010/0040373 A1* | 2/2010 | Maeda | H04B 10/0777 398/79 |
| 2013/0329277 A1* | 12/2013 | Suzuki | H01S 3/06754 359/334 |
| 2014/0043674 A1 | 2/2014 | Takasaka et al. | |
| 2015/0036210 A1 | 2/2015 | Asobe et al. | |
| 2016/0172818 A1 | 6/2016 | Takasaka | |

OTHER PUBLICATIONS

"Fiber Bragg grating." Wikipedia, Wikimedia Foundation, Dec. 18, 2017, en.wikipedia.org/wiki/Fiber_Bragg_grating; 14 pages.

(Continued)

*Primary Examiner* — Dzung D Tran
(74) *Attorney, Agent, or Firm* — Baker Botts L.L.P.

(57) ABSTRACT

An optical system for controlling gain modification, including a first non-linear optical element (NLE) through which an input optical signal and a first pump wavelength are transmitted to generate a first optical signal; a second NLE through which the first optical signal is amplified to generate a second optical signal; a third NLE through which the second optical signal is amplified to generate a third optical signal; a first heating element coupled to the second NLE to adjust a temperature of the second NLE to control a first gain profile of the second optical signal; a second heating element coupled to the third NLE to adjust a temperature of the third NLE to control a second gain profile of the third optical signal, wherein the temperatures of the second and the third NLE minimize a gain modulation of the optical system based on the first and the second gain profiles.

20 Claims, 6 Drawing Sheets

(56) References Cited

OTHER PUBLICATIONS

"Reinforced FBG Sensors Serve Demanding Applications." Technica, Dec. 18, 2017, technicasa.com/reinforced-fbg-sensors-serve-demanding-applications/; Published Sep. 22, 2016. 10 pages.
Notice of Allowance for U.S. Appl. No. 15/426,811, dated Feb. 12, 2018; 14 pages.

* cited by examiner

CONTROLLING GAIN MODULATION IN OPTICAL COMMUNICATION NETWORKS

BACKGROUND

Field of the Disclosure

The present disclosure relates generally to optical communication networks and, more particularly, to controlling gain modulation in optical communication networks.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

SUMMARY

Innovative aspects of the subject matter described in this specification may be embodied in an optical system for controlling gain modification, the optical system including an input optical signal; a pump laser generating a pump wavelength; a first non-linear optical element (NLE) through which the input optical signal and the first pump wavelength are transmitted to generate a first optical signal comprising the input optical signal and the pump wavelength; a second NLE through which the first optical signal is amplified to generate a second optical signal; a third NLE through which the second optical signal is amplified to generate a third optical signal; a first heating element coupled to the second NLE to adjust a local temperature of the second NLE to control a first gain profile of the second optical signal; and a second heating element coupled to the third NLE to adjust a local temperature of the third NLE to control a second gain profile of the third optical signal, wherein the local temperatures of the second NLE and the third NLE minimize a gain modulation of the optical system based on the first and the second gain profiles.

These and other embodiments may each optionally include one or more of the following features. For instance, the first heating element further controls a wavelength of the second optical signal, wherein the first gain profile is based on a first difference between the wavelength of the second optical signal and the pump wavelength. The second heating element further controls a wavelength of the third optical signal, wherein the second gain profile is based on a second difference between the wavelength of the third optical signal and the pump wavelength. The gain modulation is based on a combination of the first difference and the second difference. The first gain profile and the second gain profile are complimentary. The first gain profile and the second gain profile are complimentary such that the first gain profile is positive and the second gain profile is negative. The gain modulation is zero. The pump wavelength is fixed. The system includes a phase modulator for modulating a phase of the pump wavelength, wherein the first gain profile and the second gain profile are based on the phase of the pump wavelength. The system includes a phase modulator for modulating a phase of the pump wavelength, wherein the first difference and the second difference are based on the phase of the pump wavelength.

Innovative aspects of the subject matter described in this specification may be embodied in a method for controlling gain modification in optical networks, the method including receiving an input optical signal; transmitting the input optical signal and a pump wavelength through a first non-linear element (NLE) to generate a first optical signal comprising the input optical signal and the pump wavelength; amplifying the first optical signal through a second NLE to generate a second optical signal; amplifying the second optical signal through a third NLE to generate a third optical signal; adjusting a local temperature of the second NLE to control a first gain profile of the second optical signal; and adjusting a local temperature of the third NLE to control a second gain profile of the third optical signal, wherein the local temperatures of the second NLE and the third NLE minimize a gain modulation of the optical system based on the first and the second gain profiles.

These and other embodiments may each optionally include one or more of the following features. For instance, adjusting the local temperature of the second NLE further includes controlling a wavelength of the second optical signal, wherein the first gain profile is based on a first difference between the wavelength of the second optical signal and the pump wavelength. Adjusting the local temperature of the third NLE further includes controlling a wavelength of the third optical signal, wherein the second gain profile is based on a second difference between the wavelength of the third optical signal and the pump wavelength. The gain modulation is based on a combination of the first difference and the second difference. The first gain profile and the second gain profile are complimentary. The first gain profile and the second gain profile are complimentary such that the first gain profile is positive and the second gain profile is negative. The gain modulation is zero. The pump wavelength is fixed. Modulating a phase of the pump wavelength, wherein the first gain profile and the second gain profile are based on the phase of the pump wavelength. Modulating a phase of the pump wavelength, wherein the first difference and the second difference are based on the phase of the pump wavelength.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
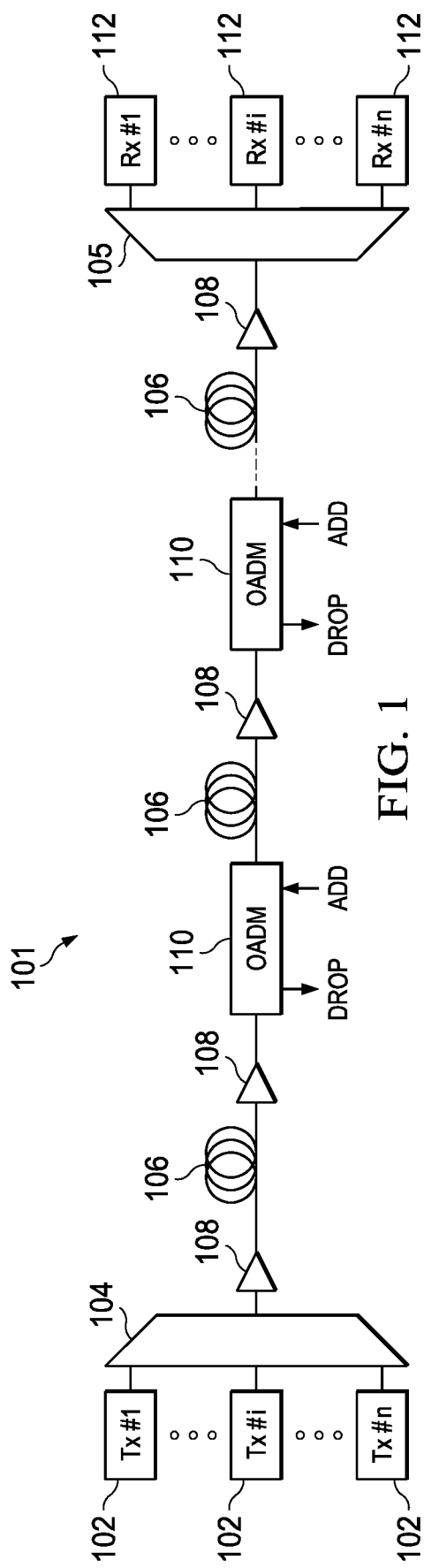
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity.

Achieving higher bit rates may be limited by the availability of wide bandwidth electrical driver technology, digital signal processor technology and increase in the optical signal noise ratio (OSNR) for transmission over optical network 101.

Current designs for optical amplifiers may include optical phase-sensitive amplifiers (PSA). A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals.

Figure 2:
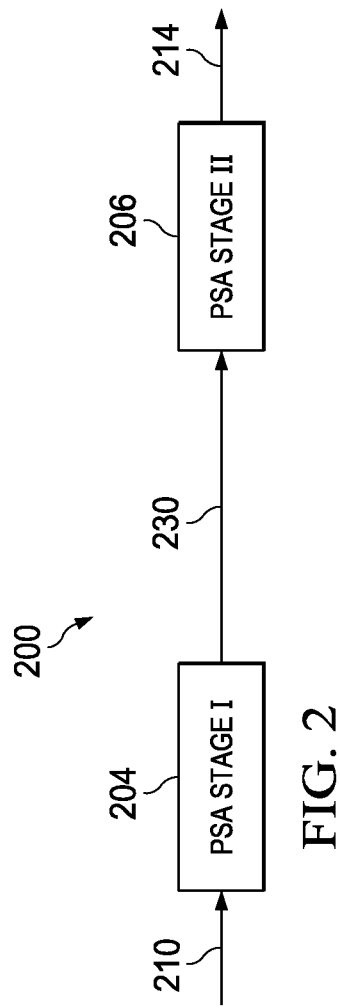
FIG. 2 is a block diagram of selected elements of an embodiment of an optical phase-sensitive amplifier.

FIG. 2 is a block diagram of selected elements of an embodiment of an optical PSA 200. In PSA 200, a WDM optical signal 210 may be received by a PSA stage I 204. In PSA stage I 204, simple four wave mixing (FWM) may occur to generate so-called "idler signals", which are conjugate wavelengths of an optical signal, such as WDM optical signal 210, relative to a pump wavelength. In FWM, the idler signals appear when the optical signal and the pump wavelength are passed through a non-linear element (NLE), such as a highly non-linear fiber (HNLF). In various embodiments, other NLEs may also be used to facilitate FWM, such as optical crystals or other optical materials. In the NLE, photons are converted from the pump wavelength and the optical signal to the idler signal by non-linear processes.

Accordingly, PSA stage I 204 outputs a PSA stage I optical signal 230, in which the intensity of the pump wavelength and the optical signal is diminished, but in which the idler signals have been added. Conjugate idler signals may appear in PSA stage I optical signal 230 for each channel in the WDM optical signal 210. It is noted that PSA stage I 204 may be used with an input signal that includes a single optical channel.

Then, in PSA 200, a PSA stage II 206 may receive PSA stage II optical signal 230 and may amplify WDM optical signal 210. PSA stage II 206 may also include Raman amplification, as well as other elements described in further detail below, in order to generate output WDM output signal 214, in which the channels have been amplified relative to input WDM optical signal 210.

Figure 3:
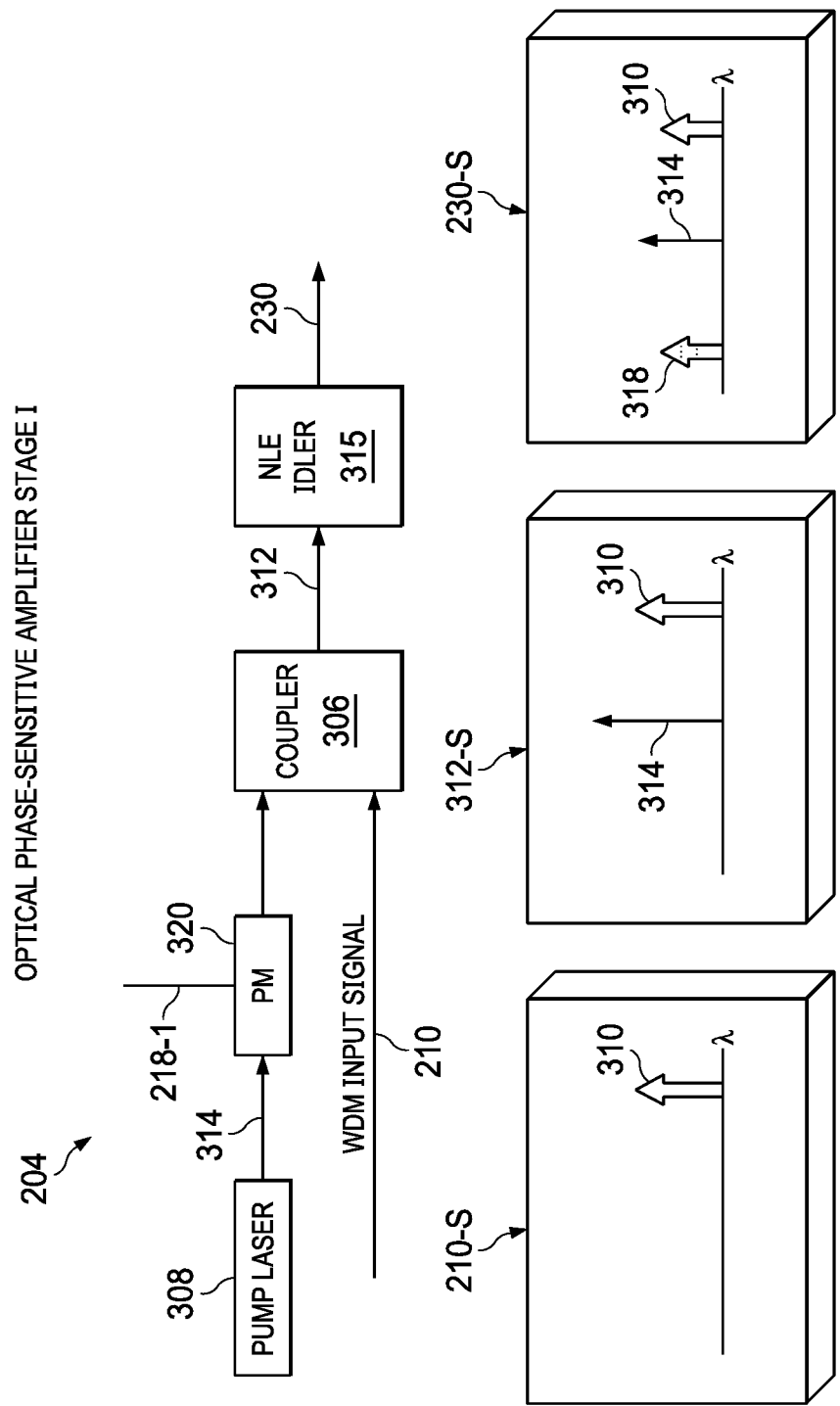
FIG. 3 is a block diagram of selected elements of an embodiment of an optical phase-sensitive amplifier stage I.

Referring now to FIG. 3, selected elements of an embodiment of an optical PSA stage I 204 are depicted. In FIG. 3, optical PSA stage I 204 is shown in a schematic representation and is not drawn to scale. It is noted that, in different embodiments, optical PSA stage I 204 may be operated with additional or fewer elements as shown in FIG. 3.

In FIG. 3, optical PSA stage I 204 receives WDM input signal 210 and adds a pump wavelength 314 from a pump laser 308 using coupler 306. Pump wavelength 314 is phase modulated using phase modulator (PM) 320, which is shown receiving first phase control signal 218-1 from phase shifter 208, as described above. Intermediate stage I signal 312, comprising WDM input signal 210 and phase-modulated pump wavelength 314 are then sent to NLE idler 315, which is a non-linear optical element. Because intermediate stage I signal 312 includes pump wavelength 314 and WDM input signal 210, simple four wave mixing (FWM) may occur at NLE idler 315 to generate idler signals 318, resulting in PSA stage I optical signal 230, as described above with respect to FIG. 2.

Also shown in FIG. 3 are spectra of the different signals transmitted in optical PSA stage I 204. In spectra 210-S, optical signal 310 represents one or more wavelengths included in WDM input signal 210. In spectra 312-S, corresponding to intermediate stage I signal 312, pump wavelength 314 is added to optical signal 310. In spectra 230-S corresponding to PSA stage I optical signal 230, idler signal 318 has been added, representing corresponding one or more wavelengths of optical signal 310, but spectrally spaced symmetrically with respect to pump wavelength 314. Also, the optical power of the signals in spectra 230-S has been reduced, which is indicative of FWM to generate idler signal 318.

Figure 4:
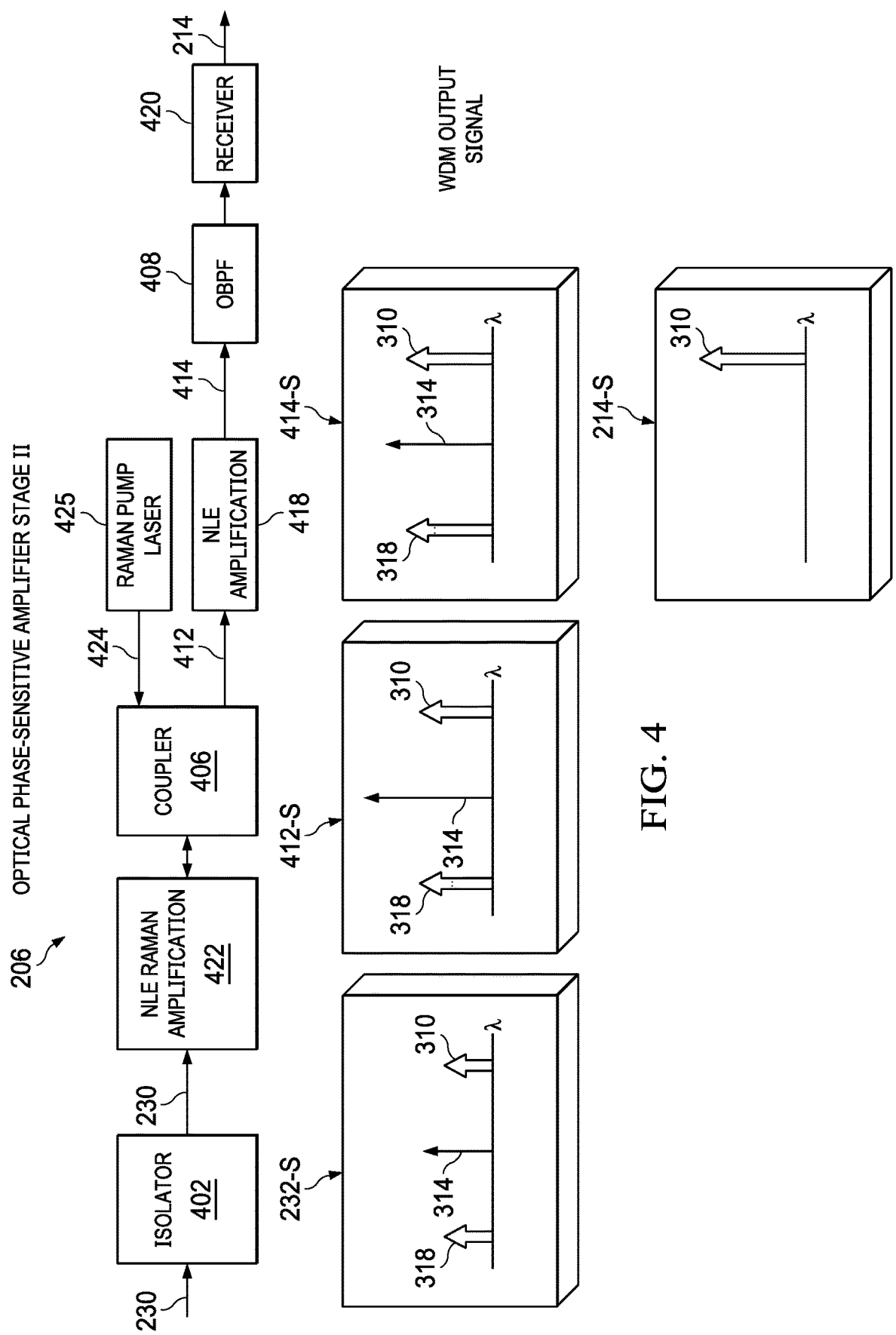
FIG. 4 is a block diagram of selected elements of an embodiment of an optical phase-sensitive amplifier stage II.

Referring now to FIG. 4, selected elements of an embodiment of an optical PSA stage II 206 are depicted. In FIG. 4, optical PSA stage II 206 is shown in a schematic representation and is not drawn to scale. It is noted that, in different embodiments, optical PSA stage II 206 may be operated with additional or fewer elements as shown in FIG. 4.

In FIG. 4, optical PSA stage II 206 receives PSA stage I optical signal 230 from optical PSA stage I 204. PSA stage I optical signal 230 may be passed through isolator 402 to prevent back propagation of a Raman pump wavelength 424, before sending PSA stage I optical signal 230 to NLE Raman amplification 422, which receives the Raman pump wavelength 424 from a Raman pump laser 425 using coupler 406 in a counter propagating direction. PSA stage I optical signal 230 may include optical signal 310, which comprises the wavelengths in input WDM optical signal 210, as described above, along with corresponding idler signals 318 and pump wavelength 314.

In optical PSA stage II 206, NLE Raman amplification 422 may comprise a Raman amplifier that includes Raman pump laser 425, which may be a laser source that is directed through an NLE as a gain medium in a counter propagation direction to the optical signal being processed (PSA stage I optical signal 230). Raman pump wavelength 424 from Raman pump laser 425 may be selected based on the gain medium used. For example, a 13 THz Raman pump frequency may be used with $GeO_2/SiO_2$ single mode fibers (SMF) as the NLE, while a 40 THz Raman pump frequency may be used with $P_2O_5$-doped $SiO_2$ phosphate-doped fiber (PDF) as the NLE in NLE Raman amplification 422. Furthermore, modulation or modification of the optical power of Raman pump laser 425 may be used to determine or modify an optical gain of NLE Raman amplification 422. It is noted that Raman amplification may be optional in some embodiments of optical PSA stage II 206, such that isolator 402, NLE Raman amplification 422, coupler 406, and Raman pump laser 425 may be omitted.

The output of NLE Raman amplification 422 is shown as Raman amplified optical signal 412, which is directed to NLE amplification 418, which is a non-linear optical element. In the presence of Raman amplified optical signal 412, one-pump four wave mixing (FWM) may occur at NLE amplification 418 to amplify the WDM optical signal and the idler signals, at the expense of the intensity of pump wavelength 314. NLE amplification 418 may include components for performing one-pump optical four-wave mixing (FWM). The one-pump FWM may be accomplished by passing the input signal, or filtered portions thereof, through a non-linear optical element (NLE), such as a doped optical fiber, periodically poled lithium niobate (PPLN), aluminium gallium arsenide (AlGaAs) or other semiconductor material that exhibits desired optical non-linearity.

After NLE amplification 418, optical signal 414 includes the amplified WDM optical signals and idler signals, along with the diminished intensity of pump wavelength 314. An optical bandpass filter (OBPF) 408 may then be applied to isolate WDM output signal 214. Then, a receiver 420 can receive the signal from the OBPF 408.

Also shown in FIG. 4 are spectra of the different signals transmitted in optical PSA stage II 206. In spectra 232-S, optical signal 310 represents one or more wavelengths included in WDM output signal 214, while idler signals 318 are conjugates of optical signal 310 with respect to pump wavelength 314. In spectra 412-S, corresponding to Raman amplified optical signal 412, optical signal 310, pump wavelength 314, and idler signals 318 may be amplified (shown with increased signal intensity). In spectra 414-S, optical signal 310 and idler signals 318 may be amplified at the expense of pump wavelength 314, corresponding to FWM. In spectra 214-S, optical signal 310 is isolated in amplified form to generate WDM output signal 214.

Figure 5:
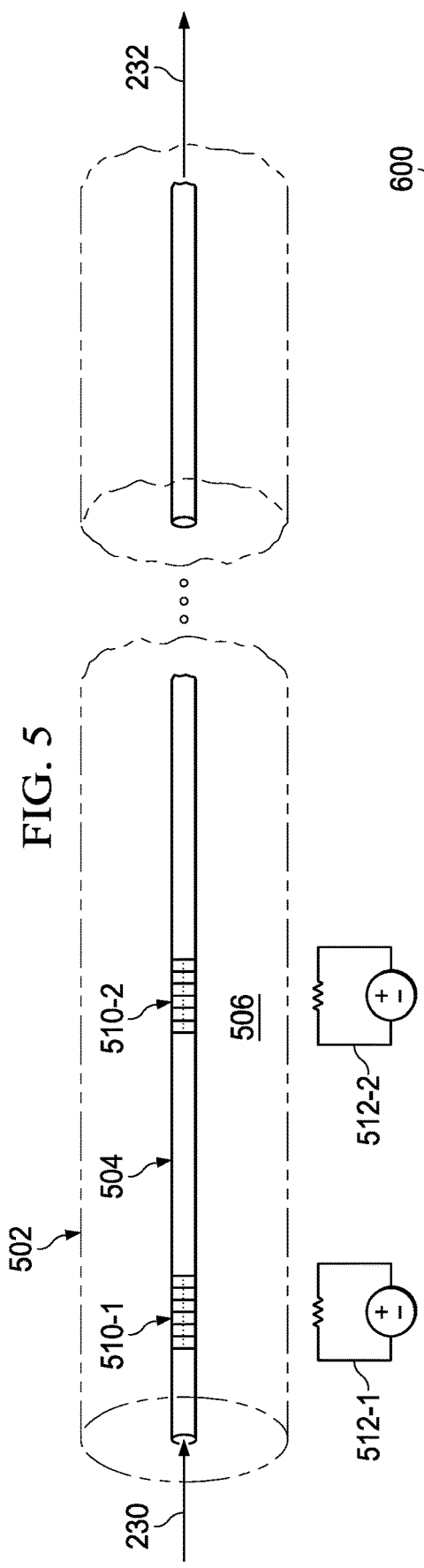
FIG. 5 illustrates an optical fiber that is enabled to transmit optical signals.

FIG. 5 illustrates an optical fiber 502 that is enabled to transmit optical signals, e.g., the optical signals described above with respect to FIGS. 2-4. FIG. 5 is a schematic illustration and is not drawn to scale or perspective. Optical fiber 502 is comprised of a cladding 506 and a fiber core 504 that transmits optical signals due to differences in the index of refraction within optical fiber 502.

Within fiber core 504, a plurality of highly non-linear fiber (HNLF) elements 510 are shown, including HNLF elements 510-1 and 510-2. HNLF elements 510 are shown equivalent in FIG. 5 for descriptive clarity, however, each individual HNLF element 510 may be particularly designed or constructed to transmit a range of wavelengths, for example, corresponding to wavelengths in PSA stage I optical signal 230 (and PSA stage II optical signal 232), as described previously.

Also shown in FIG. 5 are heating devices 512 corresponding to each individual HNLF element 510. Specifically, heating device 512-1 may be used to individually control temperature of HNLF element 510-1; and heating device 512-2 may be used to individually control temperature of HNLF element 510-2. Heating devices 512 may also include a temperature sensor and control logic (not shown), such as a microcontroller or microprocessor having access to a non-transitory memory media storing executable instructions to perform temperature control for a corresponding HNLF element 510. Accordingly, each HNLF element 510/heating device 512 pair may operate independently with regard to temperature control, in order to provide appropriate gain profiles, described further herein. Specifically, the gain profile of an optical signal associated with each HNLF element 510 is dependent on the temperature at the HNLF element 510.

In some examples, the HNLF elements 510 can correspond to any of NLE idler 314, NLE amplification 418, and NLE Raman amplification 422.

Figure 6:
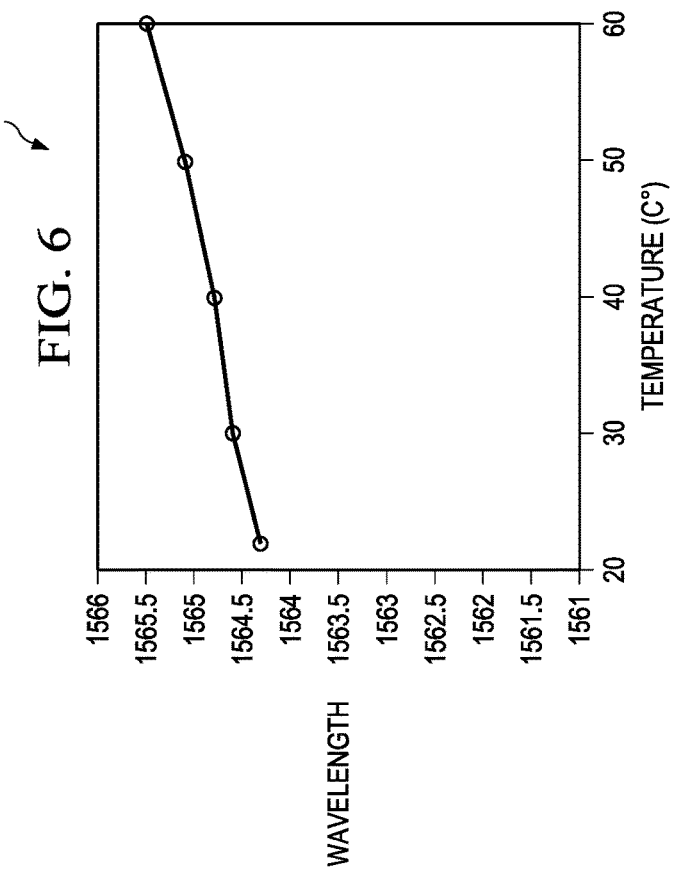
FIG. 6 is a graph depicting a wavelength of the optical fiber as a function of temperature.

FIG. 6 illustrates a graph 600 depicting a wavelength of the optical fiber 502 as a function of temperature. In general, as the temperature of the optical fiber 502 is increased, the wavelength (e.g. lambda zero) is increased based on a predetermined relationship.

Figure 7:
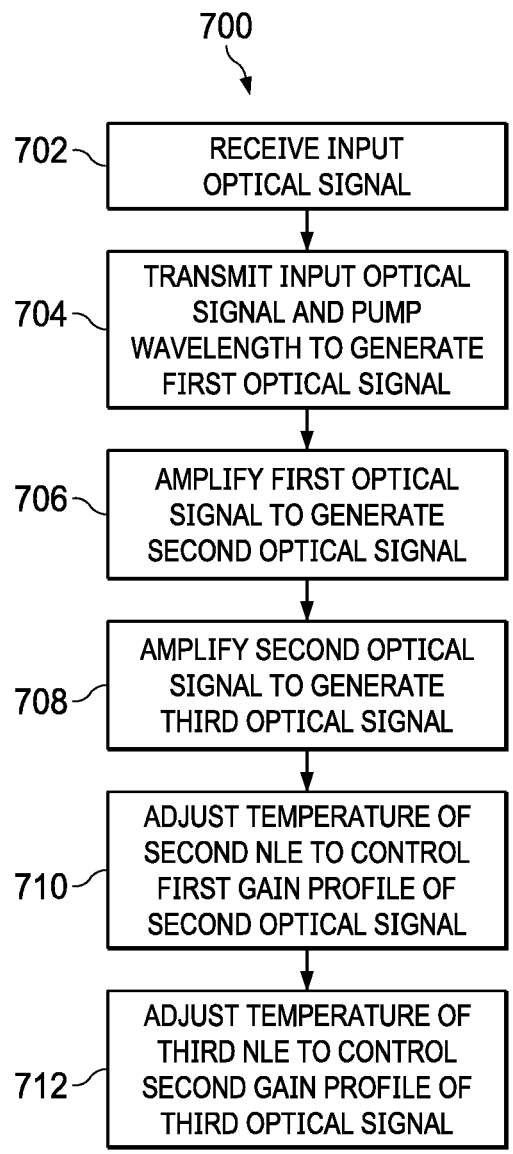
FIG. 7 is a method for controlling gain modification in optical networks.

FIG. 7 illustrates a flowchart depicting selected elements of an embodiment of a method 700 for controlling gain modification in optical networks. The method 700 may be performed by the PSA 200 in an optical network. It is noted that certain operations described in method 700 may be optional or may be rearranged in different embodiments.

An input optical signal is received (702). For example, the optical PSA stage I 204 receives the WDM input signal 210. The input optical signal and a pump wavelength are transmitted through a first non-linear element (NLE) to generate a first optical signal comprising the input optical signal and the pump wavelength (704). For example, the optical PSA stage I 204 adds a pump wavelength 314 from the pump laser 308 using the coupler 306. The first optical signal can include the PSA stage I optical signal 230 that is output by the NLE idler 315. In some examples, the pump wavelength is fixed.

The first optical signal is amplified through a second NLE to generate a second optical signal (706). For example, the output of NLE Raman amplification 422 is Raman amplified optical signal 412. The second optical signal is amplified through a third NLE to generate a third optical signal (708). For example, the NLE amplification 418 can generate the optical signal 414 that includes the amplified WDM optical signals and idler signals.

Figure 8:
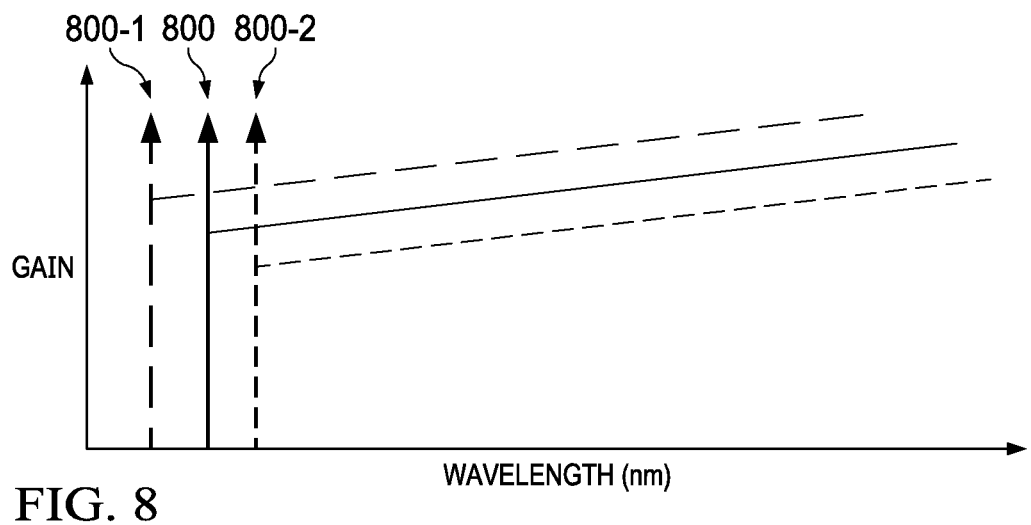
FIGS. 8 and 9 illustrate gain profiles.

A local temperature of the second NLE can be adjusted to control a first gain profile of the second optical signal (710). For example, a heating device 512 can control the temperature of a corresponding HNLF element 510 (e.g., one of the NLE amplification 418 and the NLE Raman amplification 422). In some examples, the heating device 512 controls the temperature of the corresponding HNLF element 510 to control a wavelength of the second optical signal (e.g., of the optical fiber 502). In some examples, the first gain profile is based on a difference between the wavelength of the second optical signal and the pump wavelength. For example, the first gain profile can be based on the difference between the wavelength of the Raman amplified optical signal 412 and the pump wavelength 314. FIG. 8 illustrates a gain profile 800 that can correspond to the first gain profile of the second optical signal.

Figure 9:
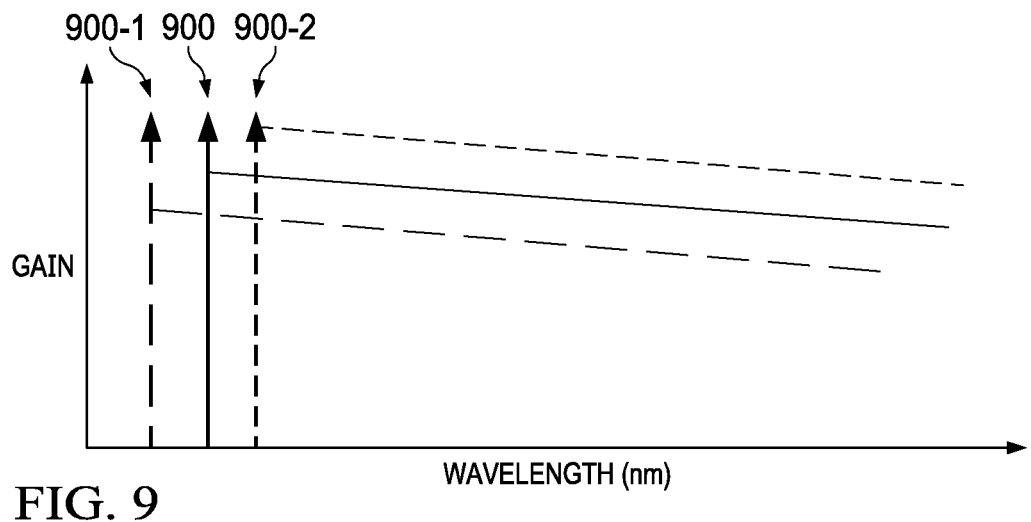

A local temperature of the third NLE can be adjusted to control a second gain profile of the third optical signal (712). For example, a heating device 512 can control the temperature of a corresponding HNLF element 510 (e.g., one of the NLE amplification 418 and the NLE Raman amplification 422). In some examples, the heating device 512 controls the temperature of the corresponding HNLF element 510 to control a wavelength of the third optical signal (e.g., of the optical fiber 502). In some examples, the second gain profile is based on a difference between the wavelength of the third optical signal and the pump wavelength. For example, the second gain profile can be based on the difference between the wavelength of the optical signal 414 and the pump wavelength 314. FIG. 9 illustrates a gain profile 900 that can correspond to the second gain profile of the third optical signal.

To that end, the local temperatures of the second NLE and the third NLE minimize a gain modulation of the PSA 200 based on the first and the second gain profiles. Specifically, the gain modulation is based on a combination of i) the first difference the wavelength of the second optical signal and the pump wavelength and ii) the second difference between the wavelength of the third optical signal and the pump wavelength. That is, as the first gain profile—e.g., the gain profile 800—and the second gain profile—e.g., the gain profile 900—are complimentary (or symmetric), the two gain profiles cancel any gain modulation of the PSA 200. That is, the gain modulation can be zero. In some examples, the gain profiles can be complimentary in that the first gain profile—e.g., the gain profile 800—is positive and the second gain profile—e.g., the gain profile 900—is negative.

In some examples, the pump wavelength is modulated. For example, the pump wavelength 314 is phase modulated using phase modulator (PM) 320. The first gain profile—e.g., the grain profile 800—and the second gain profile—e.g., the gain profile 900, can be based on the phase of the pump wavelength. For example, the gain profile 800 can include pump wavelength drift by phase modulation, resulting in the gain profiles 800-1 or 800-2.

Additionally, the gain profile 900 can include pump wavelength drift by phase modulation, resulting in the gain profiles 900-1 or 900-2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An optical system for controlling gain modification, the optical system comprising:
   an input optical signal;
   a pump laser generating a pump wavelength;
   a first non-linear optical element (NLE) through which the input optical signal and the first pump wavelength are transmitted to generate a first optical signal comprising the input optical signal and the pump wavelength;
   a second NLE through which the first optical signal is amplified to generate a second optical signal;
   a third NLE through which the second optical signal is amplified to generate a third optical signal;
   a first heating element coupled to the second NLE to adjust a local temperature of the second NLE to control a first gain profile of the second optical signal; and
   a second heating element coupled to the third NLE to adjust a local temperature of the third NLE to control a second gain profile of the third optical signal,
   wherein the local temperatures of the second NLE and the third NLE minimize a gain modulation of the optical system based on the first and the second gain profiles.

2. The system of claim 1, wherein the first heating element further controls a wavelength of the second optical signal, wherein the first gain profile is based on a first difference between the wavelength of the second optical signal and the pump wavelength.

3. The system of claim 2, wherein the second heating element further controls a wavelength of the third optical signal, wherein the second gain profile is based on a second difference between the wavelength of the third optical signal and the pump wavelength.

4. The system of claim 3, wherein the gain modulation is based on a combination of the first difference and the second difference.

5. The system of claim 3, further comprising:
   a phase modulator for modulating a phase of the pump wavelength, wherein the first difference and the second difference are based on the phase of the pump wavelength.

6. The system of claim 1, wherein the first gain profile and the second gain profile are complimentary.

7. The system of claim 6, wherein the first gain profile and the second gain profile are complimentary such that the first gain profile is positive and the second gain profile is negative.

8. The system of claim 1, wherein the gain modulation is zero.

9. The system of claim 1, wherein the pump wavelength is fixed.

10. The system of claim 1, further comprising:
    a phase modulator for modulating a phase of the pump wavelength, wherein the first gain profile and the second gain profile are based on the phase of the pump wavelength.

11. A method for controlling gain modification in optical networks, the method comprising:
    receiving an input optical signal;
    transmitting the input optical signal and a pump wavelength through a first non-linear element (NLE) to generate a first optical signal comprising the input optical signal and the pump wavelength;
    amplifying the first optical signal through a second NLE to generate a second optical signal;
    amplifying the second optical signal through a third NLE to generate a third optical signal;
    adjusting a local temperature of the second NLE to control a first gain profile of the second optical signal; and
    adjusting a local temperature of the third NLE to control a second gain profile of the third optical signal,
    wherein the local temperatures of the second NLE and the third NLE minimize a gain modulation of the optical system based on the first and the second gain profiles.

12. The method of claim 11, wherein adjusting the local temperature of the second NLE further includes controlling a wavelength of the second optical signal, wherein the first gain profile is based on a first difference between the wavelength of the second optical signal and the pump wavelength.

13. The method of claim 12, wherein adjusting the local temperature of the third NLE further includes controlling a wavelength of the third optical signal, wherein the second gain profile is based on a second difference between the wavelength of the third optical signal and the pump wavelength.

14. The method of claim 13, wherein the gain modulation is based on a combination of the first difference and the second difference.

15. The method of claim 13, further comprising modulating a phase of the pump wavelength, wherein the first difference and the second difference are based on the phase of the pump wavelength.

16. The method of claim 11, wherein the first gain profile and the second gain profile are complimentary.

17. The method of claim 16, wherein the first gain profile and the second gain profile are complimentary such that the first gain profile is positive and the second gain profile is negative.

18. The method of claim 11, wherein the gain modulation is zero.

19. The method of claim 11, wherein the pump wavelength is fixed.

20. The method of claim 11, further comprising modulating a phase of the pump wavelength, wherein the first gain profile and the second gain profile are based on the phase of the pump wavelength.

* * * * *